United States Patent [19]

Nahm et al.

[11] Patent Number: 5,370,181
[45] Date of Patent: Dec. 6, 1994

[54] ANTI GAS-MIGRATION CEMENTING

[75] Inventors: James J. W. Nahm, Houston, Tex.; Kazem Javanmardi, Slidell, La.

[73] Assignee: Shell Oil Company, Houston, Tex.

[21] Appl. No.: 106,013

[22] Filed: Aug. 13, 1993

[51] Int. Cl.$^5$ .................... E21B 33/138; E21B 33/14; E21B 47/06

[52] U.S. Cl. .................... 166/250; 166/292; 166/293

[58] Field of Search ................ 166/292, 293, 250, 253

[56] References Cited

U.S. PATENT DOCUMENTS

| | | |
|---|---|---|
| 2,822,873 | 2/1958 | Harmsen et al. |
| 3,502,148 | 3/1970 | Slagle et al. ............ 166/292 |
| 4,219,471 | 8/1980 | Detroit ............... 166/293 X |
| 4,333,764 | 6/1982 | Richardson . |
| 5,016,711 | 5/1991 | Cowan . |
| 5,020,594 | 6/1991 | Gill ....................... 166/250 |
| 5,020,598 | 6/1991 | Cowan et al. . |
| 5,058,679 | 10/1991 | Hale et al. . |
| 5,106,423 | 4/1992 | Clarke ................ 166/293 X |
| 5,199,489 | 4/1993 | Johnson et al. ......... 166/250 |

OTHER PUBLICATIONS

"Mud to Cement Technology Proven in Offshore Drilling Project", by Javanmardi et al., Oil & Gas Journal, Feb. 15, 1993, pp. 49–57.

"Conversion of Drilling Fluids to Cements with Blast Furnace Slag—Performance Properties and Applications for Well Cementing", SPE Paper 24575, Cowan et al (Oct., 1992).

*Primary Examiner*—George A. Suchfield

[57] ABSTRACT

A casing or liner in a wellbore penetrating a zone having high formation gas pressure is cemented with a cementitious slurry comprising blast furnace slag. In one embodiment the cementitious slurry is made by combining blast furnace slag and a drilling fluid. Also, a method for plugging or setting sidetracking plugs and other secondary cementing operations in a wellbore penetrating a zone having high gas formation pressure comprising placing a mass of blast furnace slag cementitious slurry at a preselected location and allowing the slurry to set.

21 Claims, 1 Drawing Sheet

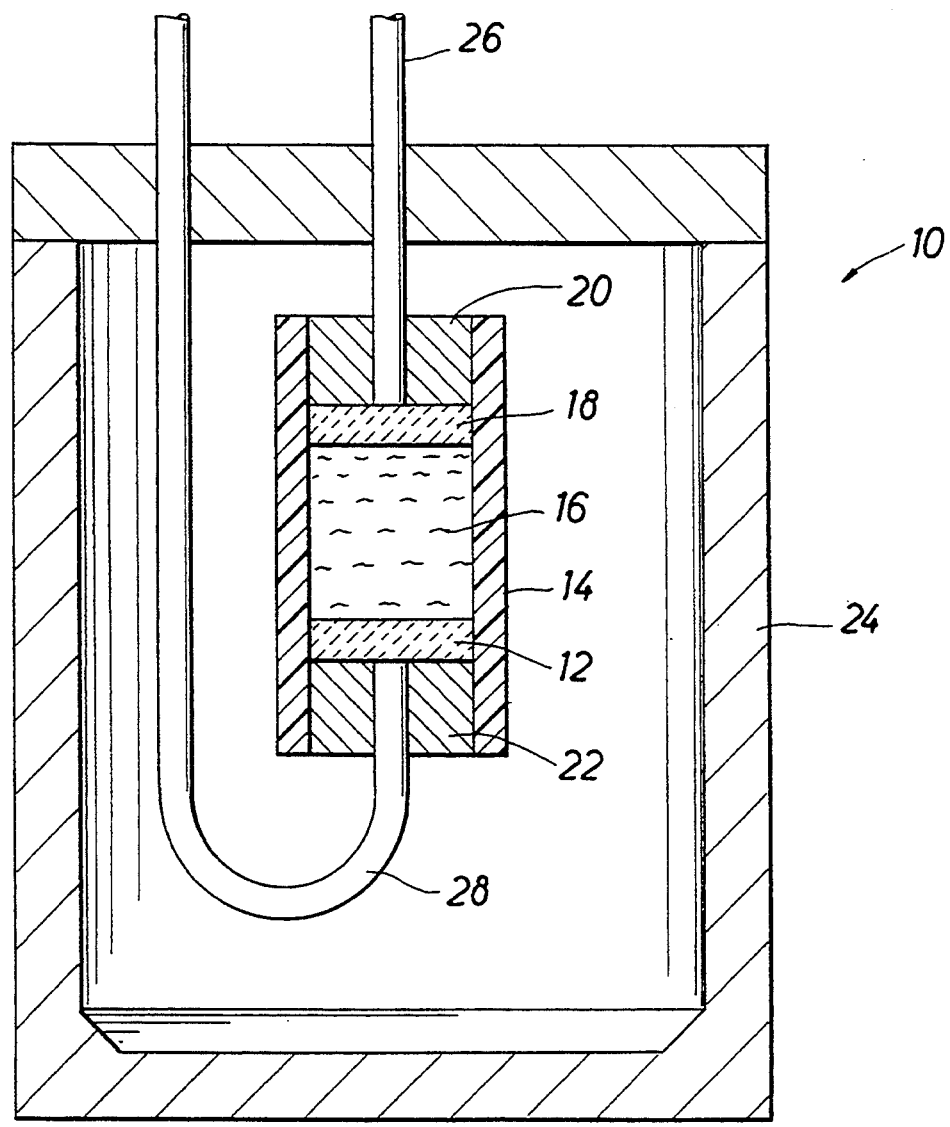

ANTI GAS-MIGRATION CEMENTING

BACKGROUND OF THE INVENTION

This invention relates to cementing in subterranean wells.

For over ninety years oil well casings and liners have been cemented with Portland cement. Portland cement has continued to be used during this time period in spite of the fact that it has two serious deficiencies. First, it is incompatible with most drilling fluids. Second, it tends to allow gas migration and gas leakage in situations where the wellbore goes through a gas producing formation. The term "gas migration" is used herein to mean the migration of gas and/or liquid. Similarly, the term "gas leakage" is used herein to mean the leakage of gas and/or liquid.

Gas migration through a cementitious slurry is the result of complex chemical and physical processes occurring after the cementitious slurry is placed in an annulus. Gas migration may occur at the formation/cementitious slurry interface, the cementitious slurry/casing interface or through the matrix of the cementitious slurry. This usually occurs within a few hours of the placement of the cementitious slurry in the annulus.

Gas leakage is flow of gas or liquid around or through the hardened cement sheath in the annulus. Gas leakage may occur at the casing/cement interface, the cement/formation interface, or through channels in the cement. Leakage of gas or liquid may occur as a result of (1) poor drilling fluid removal, (2) incomplete cement sheath around the casing, (3) casing contraction resulting in a micro annulus at the casing/cement interface, (4) shrinkage of the cement during hydration, (5) dehydration of the drilling fluid filter cake, (6) fluid loss to the formation during hardening or (7) gas migration through the cementitious slurry as it hardens thus leaving channels.

Cementitious slurries are suspensions of reactive or hydraulic solids in water. Chemical hydration of the cementitious component results in the transformation of the liquid slurry into a solid which is intended to provide a hydraulic seal in the annulus and provide support for the casing or liner. Hydration of the cementitious component occurs in stages and is accompanied by the liberation of heat and considerable gel strength development during the initial setting period.

Portland cement hydration begins immediately upon contact with water. The cement grains undergo a rapid period of hydration. Heat is liberated during this hydration, since most of the cement hydration reactions are exothermic. The surfaces of the cement grains become coated with a layer of initial hydration products. As this occurs, the water has less access to unhydrated portions of the cement grains, and the overall reaction rate decreases.

The decrease in reaction rate marks the beginning of the "dormant" or "induction" where essentially no additional hydration occurs. In a typical cementing operation, the cement is placed in the annulus during the dormant period. Gelation can occur during the dormant period from electrostatic and chemical interactions between cement particles and/or additives. Generally, gelation in Portland cement results in the creation of such high gel strength as to prevent transmission of sufficient hydrostatic pressure to hold back the gas or liquid through hydraulic pressure, but insufficient gel strength to physically hold back the gas or liquid. That is, the hydrostatic pressure of the cement slurry drops below the formation pressure while the cementitious slurry is not yet a solid. Hence, gas migration through the matrix.

Shrinkage occurs because the volume of a new reaction product formed during Portland cement hydration is less than the volume of the unhydrated cement grains. Shrinkage has little effect on the mechanical properties of the set cement.

Two types of shrinkage occur—bulk or physical shrinkage and internal shrinkage. Bulk shrinkage is the reduction in overall volume of the cement mass, i.e., dimensional decrease. Internal shrinkage is the reduction of the volume of cement paste in the cement matrix during hydration. Bulk shrinkage may be up to 7% by volume.

Bulk shrinkage results from the solids settling, filtrate loss, hydration of the cement and inner shrinkage. Inner shrinkage and bulk shrinkage both occur during the setting and early hardening periods of the cement. Bulk shrinkage may occur during the dormant period while inner shrinkage begins in the setting period. The total shrinkage rate increases during the setting period. Furthermore, some of the shrinkage occurs after the cement has lost its ability to transmit hydrostatic pressure. This can result in a significant pressure decrease in the cemented interval in the annulus.

The pores formed from internal shrinkage of the cement are characteristically free pores, which are interconnected and increase the permeability of the cement.

All of these problems are magnified in offshore drilling operations because of the problem of avoiding gas migration while installing subsea assembly devices on the ocean floor. Gas or liquid pressure is also a problem in instances where it is desired to plug a wellbore which traverses a zone of high formation pressure. For instance, when it is desired to plug a well in anticipation of a hurricane during offshore drilling, it is highly undesirable for the plug to allow passage of the gas or liquid.

Gas pressure can manifest itself in several ways. Generally, the term refers to the actual formation pressure. This can vary from essentially zero to as high as 10,000 psi or even greater. Generally, the zones of formation gas or liquid pressure encountered at greater depths exhibit higher pressure than zones encountered at more shallow depths, although, the inverse can be true in some cases. Pressures greater than 5,000 psi, generally at 5,000 to 9000 psi can be encountered in deep offshore wells.

The term gas pressure differential refers to the difference between the formation pressure and the hydrostatic pressure of the cement slurry column at a given location. The cement slurry hydrostatic pressure must be at least as great as the formation pressure or gas migration into the slurry will occur. Prior to the onset and gelation or hardening, the formation pressure is held back by the hydrostatic head of the cementitious slurry. However, as the hydrostatic head is reduced or not transmitted by this onset of gelation or hardening, the formation pressure becomes sufficient to overcome the hydrostatic head as it is reduced or not transmitted by this onset of gelation and hardening. As little as 0.1 psi greater pressure in the formation can cause gas migration. However, generally there is a mud or cement filter cake present in the formation, in which case the differential pressure will generally have to be 10–50 psi for gas migration to occur at that interface. Typically pressure differentials of 100–500 psi cause gas migration.

The third way gas pressure manifests itself is in creating gas pressure in the annulus surrounding the casing after the cement hardens. This results if there is gas migration which produces channels in the cementitious slurry as it hardens and/or at the interface of the casing or wellbore (gas leakage) or if the mass of cement is simply permeable to the gas. This gas pressure can range from low levels such as 50 psi to dangerously high levels of, say 1,000 to 5,000 psi or higher. This can collapse the casing, or otherwise cause a dangerous condition and is unacceptable.

Recently it has been discovered that, surprisingly, that blast furnace slag can be combined with drilling fluid to make a cement which is superior to Portland cement because of its compatibility with drilling fluids and thus avoids the incompatibility problems at the cementitious slurry/drilling fluid interface which are exhibited by Portland cement, Hale et al., U.S. Pat. No. 5,058,679 (Oct. 22, 1991).

It would be desirable to avoid gas migration problems in oil cementing operations in general. It would further be desirable to avoid gas migration problems during the setting of subsea assemblies in offshore drilling. It would also be desirable to allow plugging of wellbores traversing a zone of high formation pressure in a manner that does not allow passage of the gas or liquid.

SUMMARY OF THE INVENTION

It is an object of this invention to cement a wellbore traversing a zone of high formation pressure.

It is a further object of this invention to set a subsea assembly in a wellbore traversing a zone of high formation pressure.

It is a further object of this invention to provide an impermeable plug in a wellbore traversing a zone of high formation pressure.

It is yet a further object of this invention to provide a seal between the casing and formation in a wellbore traversing a zone of high formation gas pressure.

It is yet a further object of this invention to plug a wellbore which traverses a zone of high formation pressure.

In accordance with one embodiment of this invention a cementitious slurry comprising water and blast furnace slag is introduced into an annulus surrounding a pipe in a borehole wherein said borehole penetrates a zone having high formation pressure.

In another embodiment of this invention a subsea assembly is affixed to a casing in a wellbore traversing a zone of high formation pressure utilizing a process comprising introducing a lead cementitious slurry comprising blast furnace slag, retarder and water followed by a tail cementitious slurry comprising blast furnace slag and water, allowing the tail to set thus holding the bottom of the casing and setting the subsea assembly while the lead cementitious slurry remains sufficiently fluid to exert hydrostatic pressure greater than the formation pressure.

In another embodiment of this invention, a wellbore traversing a zone of high formation pressure is plugged utilizing a cementitious slurry composition comprising blast furnace slag and water.

BRIEF DESCRIPTION OF THE DRAWING

The drawing, forming a part hereof, is a cross section of a cement pressure test cell.

DETAILED DESCRIPTION OF THE INVENTION

Surprisingly, it has been found that casings can be set in wellbores traversing a zone of high formation pressure by utilizing a cementitious slurry comprising blast furnace slag and water. While many factors are known to affect gas migration, apparently the essential absence of internal shrinkage when blast furnace slag hydrates is a major factor in preventing gas migration. Lower bulk shrinkage, more rapid setting when setting does begin, and greater compatibility of the blast furnace slag with the drilling fluid (and filter cake from the drilling fluid) tend to mitigate gas leakage and gas migration at the cement/wellbore interface.

Definitions

By "high formation pressure" is meant gas and/or liquid pressure in a formation which is sufficient to migrate into the wellbore during cementing with Portland cement during gelation and hardening.

By "cementitious material" is meant a material which on hydration forms a hard cement.

By "cementitious slurry" is meant a slurry comprising a cementitious material and any ingredients necessary to cause it to harden.

By "barrel" is meant a standard 42-gallon petroleum barrel.

By "direct fluid contact" between the displacement fluid and the blast furnace slag cementitious slurry is meant that the displacement fluid directly contacts the upper surface of the column of blast furnace slag cementitious slurry as opposed to having a solid wiper plug disposed between the blast furnace slag cementitious slurry and the displacement fluid while displacing inside the casing. By "direct fluid contact" between the blast furnace slag cementitious slurry and the drilling fluid or mud is meant that the blast furnace slag cementitious slurry directly contacts the upper surface of the column of drilling fluid or mud as opposed to having a wiper plug with a rupturable diaphragm disposed between the blast furnace slag cementitious slurry and the drilling fluid or mud while displacing inside the casing.

The term "pipe" means either a casing or a liner.

The term "primary cementing" refers to any cementing operation wherein a cementitious slurry is passed into an annulus surrounding a pipe and thus encompasses both the cementing of casings wherein the annulus is between the casing and the borehole wall and the cementing of liners where the annulus includes an annulus between the liner and the casing.

By "activator system" is meant either a single activator or a mixture of activators for setting of blast furnace slag.

As used herein "down" or "bottom" as it relates to a drill string or casing, means in a direction toward the farthest reach of the borehole even though in rare instances the borehole can be disposed in a horizontal position. Similarly, "up" or "top" means back toward the beginning of the borehole.

By "psi" is meant psig.

Blast Furnace Slag Cementitious Slurries

The blast furnace slag cementitious slurries used in this invention can be produced by combining blast furnace slag with water or by combining blast furnace slag with a drilling fluid, preferably a used drilling fluid. If the slurry is made from water as opposed to drilling fluid, it will generally be desirable to incorporate a fluid loss additive into the composition so as to reduce fluid loss during the placement and setting of the cementitious slurry. Thus, on determining that Portland cement would allow gas migration in a given high pressure formation, blast furnace slag cementitious slurries can be used to successfully cement.

Fluid loss additives and free fluid control additives (formerly known as free water control) are well known in the art. Examples of natural and synthetic polymeric fluid loss additives and free fluid control additive for use in this invention include biopolymers, starch, modified starch, and polyalcohols, including polyethercyclicpolyalcohols. All types of cellulose derivatives including, specifically, carboxymethyl cellulose can also be used.

It is generally desirable to produce the cementitious slurry by combining blast furnace slag and drilling fluid. This takes advantage of the inherent compatibility of blast furnace slag with drilling fluid which contrasts with the incompatibility of Portland cement with drilling fluid. There is the additional advantage that the drilling fluid generally contains desirable additives such as fluid loss and free fluid control additives. Particularly, drilling fluids generally contain clay in amounts within the range of 2 to 50, preferably 5 to 30, more preferably 10 to 20 lbs/bbl of drilling clays. Such clays, particularly prehydrated bentonite, serve as fluid loss and free fluid control additives as well as solids for compressive strength in the cementitious slurry. Cementitious slurries made by combining blast furnace slag and drilling fluid are disclosed in Hale et al., U.S. Pat. No. 5,058,679 (Oct. 22, 1991), the disclosure of which is hereby incorporated by reference.

The cementitious slurries used in this invention can contain a surfactant, if desired, to further enhance interfacial sealing or for other reasons. Surfactants can be used in amounts within the range of about 0.1 to about 5, preferably 0.2 to 3, more preferably 1.17 to 2.33 per cent by weight based on the weight of the water in the cementitious slurry. Suitable surfactants are disclosed in Cowan, U.S. Pat. No. 5,016,711 (May 21, 1991), the disclosure of which is hereby incorporated by reference. Suitable polyalchohols and the appropriate concentrations for interfacial sealing improvement and/or fluid loss control are disclosed in Cowan, et al., U.S. Pat. No. 5,020,598 (Jun. 4, 1991) the disclosure of which is hereby incorporated by reference.

Blast Furnace Slag Detail

By "Blast furnace slag" is meant the hydraulic refuse from the melting of metals or reduction of ores in a blast furnace. Such material is disclosed in the Hale et al patent, U.S. Pat. No. 5,058,679 (Oct. 22, 1991), referred to hereinabove.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily dried and ground to the desired degree of fineness. Silicon dioxides, aluminum oxides, iron oxides, calcium oxide, magnesium oxide, sodium oxide, potassium oxide, and sulphur are some of the chemical components in slags. Generally, the blast furnace slag used in this invention has a particle size such that it exhibits a Blaine specific surface area between 2,000 $cm^2/g$ and 15,000 $cm^2/g$, preferably between 3,000 $cm^2/g$ and 15,000 $cm^2/g$, more preferably between 4,000 $cm^2/g$ and 9,000 $cm^2/g$, most preferably between 4,000 $cm^2/g$ and 8,500 $cm^2/g$. An available blast furnace slag which fulfills these requirements is marketed under the trade name "NEWCEM" by the Blue Circle Cement Company. This slag is obtained from the Bethlehem Steel Corporation blast furnace at Sparrows Point, Md.

A usual blast furnace slag composition range in weight percent is: $SiO_2$, 30–40; $Al_2O_3$, 8–18; CaO, 35–50; MgO, 0–15; iron oxides, 0–1; S, 0–2 and manganese oxides, 0–2. A typical specific example is: $SiO_2$, 36.4; $Al_2O_3$, 16.0; CaO, 43.3; MgO, 3.5; iron oxides, 0.3; S, 0.5; and manganese oxides, <0.1.

In instances where separate lead and tail slurries are used, the blast furnace slag utilized in preparing the lead slurry and the tail slurry can be the same or different but will be of the type described hereinabove.

Blast furnace slag having relatively small particle size is frequently desirable when used to form the cementitious slurries because of the greater strength it imparts in many instances to a final cement. Thus, a lead slurry containing blast furnace slag with a particle size such that it exhibits a Blaine specific surface area within the range of 2,000 to 8,000 $cm^2/g$ can be used economically, followed by a blast furnace slag tail cementitious slurry utilizing blast furnace slag having a particle size such that it exhibits a Blaine specific surface area within the range of greater than 7,000 $cm^2/g$ to 25,000 $cm^2/g$, generally 8,000 to 15,000 $cm^2/g$, which produces higher set strengths but which is more expensive. The same blast furnace slag can, however, be used in both the lead and tail blast furnace slag cementitious slurries.

Characterized in terms of particle size the term "fine" can be used to describe particles with a Blaine specific surface area in the range of 4,000 to 7,000 $cm^2/g$, corresponding to 16 to 31 microns in size; "microfine" can be used to describe those particles with a Blaine specific surface area from greater than 7,000 $cm^2/g$ to 10,000 $cm^2/g$ that correspond to particles of 5.5–16 microns in size and "ultrafine" can be used to describe particles with a Blaine specific surface area over 10,000 $cm^2/g$ that correspond to particles 5.5 microns and smaller in size. Small particles size blast furnace slags are available from Blue Circle Cement Co., Koch Minerals, Wichita, Kans., under the trade name "WELL-CEM", and from Geochem under the trade name "MICROFINE MC100".

However, it is very time consuming to grind blast furnace slag to these particle sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of preparing the cementitious slurry using blast furnace slag, a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with the slag ground under less severe conditions. Even with the less severe conditions there would be some particles within the fine, microfine or ultrafine range. Thus, only a minority, i.e., as little as 4 wt % of the slag, would need to be ground to the ultrafine particle size. Generally, 5 to 25 wt %, more preferably 5 to 10 wt % can be ground to the ultrafine particle size and the remainder ground in a normal way thus giving particles generally in a size range of greater than 11 microns, the majority being in the 1 to 31 micron range.

Activators

In its simplest form, activation may occur simply through an increase in temperature and/or the effect of residual silicate when the slurry is prepared using a drilling fluid having a silicate such as sodiumsilicate. This is particularly true at the elevated temperatures found in many deep wells. Generally, however, an activator is included in the slurry.

Suitable activators include lithium hydroxide, lithium carbonate, sodium silicate, sodium fluoride, sodium silicofluoride, magnesium hydroxide, magnesium oxide, magnesium silicofluoride, zinc carbonate, zinc silicofluoride, zinc oxide, sodium carbonate, titanium carbonate, potassium carbonate, sodium hydroxide, potassium hydroxide, potassium sulfate, potassium nitrite, potassium nitrate, calcium hydroxide, sodium sulfate, copper sulfate, calcium oxide, calcium sulfate or gypsum, calcium nitrate, calcium nitrite, and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to "lbs/bbl" means pounds per barrel of final cementitious slurry.

Retarders and Thinners

In some instances, it may be desirable to use a material for a particular effect along with the activator even though it may also act as a retarder. For instance, a chromium lignosulfonate may be used as a thinner in the cementitious slurry along with the activator even though it also functions as a retarder.

Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, phenol sulfonate, dodecylbenzene sulfonate, and mixtures thereof.

In instances where the cementitious slurry is made from drilling fluid any drilling fluid can be utilized. Water-based drilling fluids are generally preferred and this is intended to encompass both the oil-free compositions and emulsions having oil in a continuous water phase. Invert emulsions can also be utilized, i.e., those compositions having water and a continuous oil phase. Common preferred aqueous drilling fluids include lignosulfonate or seawater/lignosulfonate; gypsum or seawater/gypsum; partially hydrolyzed polyacrylamide or sodium chloride/partially hydrolyzed polyacrylamide; and lime muds including high lime, low lime and low lime/salt/alcohol. Weighted salt/PHPA muds (13 to 14.5 lbs/gal), for example, are particularly suited for use in general in this invention and particularly for use in instances involving deep well offshore operations.

By "low lime" is meant a drilling fluid having 0.5 to 3, generally 0.5 to 2 lbs of unreacted lime per barrel of drilling fluid. By "high lime" is meant drilling fluids having greater than 3.0 to 15 lbs of unreacted lime per barrel of drilling fluid. Low lime/salt/alcohol fluids have about 1 to 4 lbs per barrel of unreacted lime, about 18 to 109 lbs/bbl of salt such as sodium chloride, and about 1 to 168 lbs/bbl, preferably 10 to 80 lbs/bbl, more preferably 15 to 65 lbs/bbl, most preferably 40 to 60 lbs/bbl of a polyhydric alcohol. The units "lbs/bbl" refer to pounds per barrel of drilling fluid. The water of the drilling fluid can be fresh water or salt-containing water. Particularly in offshore operations, seawater is desirable as a fluid medium. The salt actually enhances the strength of the blast furnace slag cementitious slurry as contrasted with the detrimental effect of salt on Portland cement.

Offshore Applications

This invention is of general applicability to any form of wellbore drilled through a zone having high formation pressure. It is of particular applicability, however, in offshore operations which involve the necessity to set a subsea seal assembly. In these operations a long-string casing (for example a casing of about 11¾-inches in diameter) extends from the ocean floor to a depth of, generally, 10,000 to 15,000 feet. Two problems are presented in such operations. First, it is necessary to set a subsea seal assembly at the ocean floor. Ideally, at least 24 hours should be allowed for completing the subsea assembly installation. During this time there are two essential requirements. First, the bottom of the casing needs to be held securely and second, sufficient hydrostatic pressure needs to be applied to the column of cementitious slurry above the bottom of the long-string casing to prevent gas migration during the time the subsea assembly is being installed and tested. Finally, because of the shear length of the long-string casing it can be necessary with Portland cement to utilize a two-stage cementing operation wherein a stage collar is used in the long-string casing, generally at about the point of the casing shoe of the next larger casing. This necessitates cementing the bottom portion of the long-string casing in one stage and thereafter perforating the casing in order to cement the upper portion thereof in a second stage. This adds to the expense and complexity of the operation.

In accordance with this invention the entire long-string casing can be cemented in a single stage. Generally in such operations the single stage will involve separate lead and tail formulations with the lead being formulated to have sufficient retardation to have at least 24 hours Zero Gel Time.

By Zero Gel Time is meant the time required to develop a static gel strength of 100 lb/100 ft$^2$ gel strength as measured by Haliburton's Multi-Analysis Cement Slurry Tester (MACST).

The temperature gradient found in deep well operations wherein the bottom of the borehole will be at a relatively high temperature coupled with the inherent property of blast furnace slag slurries to be easily retarded or activated makes the preparation of the lead slurry which will maintain hydrostatic pressure while the tail slurry quickly sets to hold the bottom of the long-string casing quite easy. The ease with which the setting time can be adjusted with blast furnace slag cementitious slurries and the lighter weight of blast furnace slag compared with Portland cement also allows the cementing of the entire casing in a single stage. In accordance with this invention, temperature gradients from the top to the bottom of the pipe being cemented can be greater than 50° F. or even greater than 100° F. For instance, the top may be at 40° F. and the bottom at 152° F. for a 112° gradient. Thus, the gradient can be, for instance, within the range of 50°–150° F., more specifically 90°–130° F.

EXAMPLE 1

The following table shows the ease with which a lead slurry can be formulated with blast furnace slag which has a sufficiently long set time to maintain hydraulic pressure on high gas pressure formations while a subsea assembly is being installed in an offshore well. The cementitious slurry was prepared from a drilling mud from an offshore well having the following approximate composition: 10–20 wt % sodium chloride, 8–10 lbs/bbl (prehydrated) bentonire, 4–6 lbs/bbl carboxymethylated starch (fluid loss preventor), sold under the trade name "BIOLOSE" by Milpark, 0.5–1 lbs/bbl partially hydrolyzed polyacrylamide (PHPA) which is a shale stabilizer sold under the trade name "NEWDRILL" by Milpark, 1–1.25 lbs/bbl carboxymethyl cellulose (CMC) sold under the trade name "MILPAC" by Milpark, 30–70 lbs/bbl drill solids and sufficient barite to give a density of 11.2 lbs/gal. This is formulated using 0.83 bbls of the mud from the offshore well plus 4 lbs/bbl sodium hydroxide and 14 lbs/bbl sodium carbonate plus 140 lbs/bbl of blast furnace slag sold under the trade name "NEWCEM" by Blue Circle Cement Company. Varying amounts of "SPERSENE CF" chromium-free lignosulfonate by MI Drilling Fluids was used as a retarder. This is a very effective retarder because it does not have the sugar removed from the lignosulfonate. The resulting slurry density was 13.2 lbs/gal. Table 1 shows the effect of increasing retarder concentration at a test temperature of 145° F. which is designed to simulate the bottom hole temperature for a lead slurry. As is evident, the upper portions of such a cementitious slurry column would be at lower temperatures and thus would take even longer to set.

TABLE 1

11¾-INCH CASING LEAD FORMULATIONS:
EFFECT OF SPERSENE CF ON BLAST FURNACE SLAG CEMENTITIOUS
SLURRY PROPERTIES AT 145° F. (LEAD SLURRY BHT)

| | "SPERSENE CF" | Slurry Rheology | | | UCA Set Time[4] | | |
|---|---|---|---|---|---|---|---|
| Run | Concentration (lb/gal) | PV[1] (cp) | YP[2] (lb/100 ft$^2$) | Gels[3] | 50 psi (hr:min) | 500 psi (hr:min) | Comp. Str.[5] (psi) |
| 1 | 0 | 31 | 7 | 11/49 | 3:05 | 4:57 | 1,100 |
| 2 | 3.0 | 22 | 5 | 2/15 | 11:26 | 13:49 | 1,170 |
| 3 | 3.5 | 21 | 5 | 1/13 | 14:20 | 16:40 | 1,610 |
| 4 | 4.0 | 22 | 6 | 1/12 | 17:05 | 19:23 | 1,040 |
| 5 | 4.5 | 23 | 5 | 1/12 | 22:56 | — | 1,360 |
| 6 | 4.5 | 23 | 5 | 1/12 | 21:06 | 23:34 | 1,560 |
| 7 | 4.75 | — | — | — | 21:28 | 23:26 | 2,290 |
| 8 | 5.0 | 20 | 5 | 2/9 | 39:56 | 44:07 | 2,170 |
| 9 | 5.5 | 20 | 4 | 2/9 | 50:19 | 58:06 | 2,250 |
| 10 | 6.0 | 19 | 4 | 2/9 | 42:20 | 47:20 | 1,870 |

[1] Plastic Viscosity
[2] Yield Point
[3] Gel Strength in lb/100 ft$^2$ at 10 seconds and 10 minutes
[4] To reach indicated strength
[5] Determined by crushing As can be seen with between 4.5 and 5 lbs/gal of retarder the slurry remains sufficiently fluid to transmit hydrostatic pressure for approximately 1 day. As the last column shows, the resulting composition has adequate strength for the lead slurry cementing the upper portion of a long-string casing.

An identical formulation optionally with less retarder can be used as the tail except with higher concentration of blast furnace slag. For instance, a formulation having 13 to 14.5 lbs/gal density can be utilized for a lead and a formulation having greater than 14.5 lbs/bbl density as a result of the greater blast furnace slag concentration, generally about 15 to 16 lbs/bbl, can be used for the tail.

EXAMPLE 2

The data set out hereinbelow in Table 2 shows the long zero gel times which can be obtained utilizing the blast furnace slag cementitious slurry compositions. In this Example 2, an 11.5 lbs/gal mud from an offshore well of the same general composition as that of Example 1 was utilized. One barrel of this mud plus 4 lbs sodium hydroxide, 14 lbs sodium carbonate and 140 lbs of the same type of blast furnace slag was utilized to make the cementitious slurry. As Table 2 shows, with the sugar-containing lignosulfonate composition ("SPERSENE CF") which acts as a dispersant and a retarder, long zero gel times are easily obtained. This contrasts with the shorter zero gel times attained with "UNICAL CF", a chrome-free lignosulfonate, supplied by Milpark, in which the wood sugar has been removed.

TABLE 2

STATIC GEL STRENGTH AND ZERO GEL TIME MEASURMENT OF A 13.3 lb/gal BLAST FURNACE SLAG SLURRY HEATED TO 145° F. AT 1.2° F./MIN AT 5,000 psi

| "SPERSENE CF[1]" (lb/bbl) | "UNICAL CF[2]" (lb/bbl) | PV[3] (cp) | YP[4] (lb/100 ft$^2$) | Gels[5] | Static Gel[6] Strength (lb/100 ft$^2$) | Zero Gel[7] Time at 145° F. (hr) |
|---|---|---|---|---|---|---|
| 9 | — | 20 | 3 | 1/5 | 0 | 48+ |
| 7 | — | 18 | 2 | 1/3 | 57.5 | 31+ |
| 5 | — | 20 | 1 | 1/3 | 66 | 32+ |
| 3 | — | 19 | 1 | 1/2 | 75 | 10:00 |
| 1 | — | 18 | 5 | 1/12 | 575* | 3:37** |
| — | 3 | 18 | 4 | 2/14 | 575* | 4:18** |
| — | 1 | 17 | 6 | 2/23 | 575* | 1:52** |
| 0 | 0 | 18 | 12 | 9/60 | 575* | 1:40** |

*Maximum gel strength reading
**Transition time
[1]Trade name of MI Drilling Fluids for chrome-free lignosulfonate containing sugar.
[2]Trade name of Milpark for chrome-free lignosulfonate from which sugar has been removed.
[3]Plastic Viscosity
[4]Yield Point
[5]Gel Strength in lb/100 ft$^2$ at 10 seconds and 10 minutes
[6]Initial measurement
[7]Gel strength test were performed using a Halliburton MACST Analyzer (Multi-Analysis Cement Slurry Tester) as follows:
1. Prepare 1200 cc of the slurry using a 1 gallon capacity Waring Blender mixing container according to the standard slurry preparation procedure in Section 5 of API Spec 10.
2. Transfer the prepared slurry into the pressure vessel of the MACST
3. Apply 2000 psi starting pressure and begin stirring at 250 rpm to simulate placement of the cement.
4. Begin heating process to 160° F. Increase temperature from 75–80° F. (starting temperature) to 160° F. in 45 minutes.
5. Monitor and control pressure so that a final pressure of 8000 psi is reached when the slurry temperature reaches 160° F. (pressure increases from 2000 psi to 8000 psi in 45 minutes).
6. Continue stirring slurry at 160° F. and 8000 psi for 135 minutes after temperature has reached 160° F. (180 minutes total stirring time).
7. After 180 minutes total stirring time, stop the stirring motor and begin static gel strength test.
8. Record as Zero Gel Time the time after starting gel strength test at which the slurry has less than 100 lb/100 ft$_2$ gel strength.
9. Record time required for gel strength of slurry to go from 100 lb/100 ft$^2$ to 500 lb/100 ft$^2$ as the Transition Time of the slurry.

EXAMPLE 3

In the following example a U-tube test apparatus was used to simulate annular gas migration control in a long-string casing. The apparatus used was of the type disclosed in Richardson, U.S. Pat. No. 4,333,764 (Jun. 8, 1992). The apparatus was employed to conduct interfacial sealing tests at a temperature of 165° F. to simulate the bottom hole static temperature (BHST) at the shoe of a long-string casing. Shrinkage was determined from the U-tube data. As shown in Table 3, both samples 1 and 2 had a zero leak rate at a differential pressure of 2000 psi. Shrinkage is also very low: 1.77% for sample 1 and 1.26% for sample 2. The low shrinkage properties show the advantage for the blast furnace slag cement as compared with Portland cement. An additional treatment with a very small amount (0.1 gal/bbl) of a common anionic surfactant ("AVANEL S-150") resulted in a further reduction of shrinkage from 1.77% to 1.26%. In general, Portland cement slurries not specially designed for gas migration usually have a shrinkage between 5 to 7% and very high leak rates on the U-tube.

TABLE 3

SPERSENE CF RETARDED BLAST FURNACE SLAG U-TUBE LEAK RATE AND SHRINKAGE AT 165° F.

| Sample ID No. | "SPERSENE CF[4]" (lb/bbl) | NaOH (lb/bbl) | Addt'l Surfactant | Surfactant (gal/bbl) | Cement Shrinkage (% by vol.) | Nitrogen Gas Leak Rate (cm$^3$/min-psi) | Differential Pressure (psi) |
|---|---|---|---|---|---|---|---|
| 1 | 8 | 6 | None | N/A | 1.77 | No Leak | 2,000 |
| 2 | 8 | 6 | "AVANEL S-150[2]" | 0.1 | 1.26 | No Leak | 2,000 |

Notes:
Cementitious Slurry Basic Formulation: 11.5 lb/gal Mud as in Example 1 + 4 lb/bbl NaOH + 14 lb/bbl Na$_2$CO$_3$ + 140 lb/bbl "NEWCEM"
U-Tube Test Condition: Ramped from RT to 165° F. in one hour and maintained 72 hours.
[1]Trade name of MI Drilling fluids for chrome-free lignosulfonate containing sugar.
[2]Trade name of Mazer PPG for linear alcohol sulfonate and anionic surfactant.
[3]Trade name of Blue Circle Cement Company for water quenched blast furnace slag ground to a fineness such that it exhibits a Blaine Specific Surface area of about 5500 cm$^2$/g.

As shown in Example 2, blast furnace slag cementitious slurries can be easily formulated to have sufficiently long zero gel strength time to allow completion of mechanical operations such as the installation of a subsea seal assembly. As shown by this Example, such slurries provide excellent interfacial sealing and low shrinkage which combine to give good gas migration control.

EXAMPLE 4

In-Situ Permeability Measurement at Varying Pressure

The purpose of this experiment is to demonstrate that (1) a blast furnace slag/drilling fluid cementitious slurry set under the downhole conditions (190° F./3,000 psi) has an extremely low brine permeability, (2) higher permeability induced by changes in stress can be reversed (healed) by applying pressure, and (3) changes in downhole pressure alone may not have much impact on downhole permeability.

The drilling fluid used was essentially identical to that of Example 1.

In this experiment, slurry samples were cured in the permeability test assembly (stress cell) and remained in the cell at 190° F. while pressure conditions were varied according to the test schedule below.

In-situ permeability was measured based on the following test outlines:

Install a stress cell assembly 10 per the FIGURE in an oven.

Put a first brine saturated slice of sandstone core 12 (approx. 1-10 md) in a resilient Hassler sleeve 14.

Pour a 1" depth of blast furnace slag/drilling fluid cementitious slurry sample 16 in the sleeve.

Put another brine saturated slice of sandstone core 18 on top in contact with the slurry.

Assemble brine filled Hassler end butts 20 and 22 in the sleeve.

Pressurize vessel 24 to 3,000 psi and cure at 190° F. making sure that there is no fluid loss from the slurry.

Without relieving the pressure, measure permeability using a 50,000 ppm NaCL brine introduced through tube 26 under the same downhole condition (190° F./3,500 psi).

Receive any fluid flowing through the sample in Tube 28.

Reduce the flow or confining pressure quickly, wait at least one hour and measure the permeability at a low flow pressure, still at temperature.

Measure permeability again using the original high pressure condition.

The in-situ permeability data on the 15.3 lb/gal cementitious slurry are summarized as follows:

| Confining Pressure | Flows Pressure (delta P) | Brine Permeability |
| --- | --- | --- |
| 3,500 psi | 3,000 psi | $3 \times 10^{-6}$ md |
| 3,500 psi | 0 | |
| | (Pressure Bled) | |
| 3,500 psi | 1,000 psi | $18 \times 10^{-6}$ md |
| 3,500 psi | 1,000 psi | $13 \times 10^{-6}$ md |
| 3,500 psi | 3,000 psi | $4 \times 10^{-6}$ md |
| 0 | | |
| | (Confining pressure bled) | |
| 500 psi | 300 psi | $96 \times 10^{-6}$ md |
| 3,500 psi | 3,000 psi | $11 \times 10^{-6}$ md |
| 3,500 psi (Repeated) | 3,000 psi | $9 \times 10^{-6}$ md |

The blast furnace slag cement showed practically a zero (3 nano-darcy) brine permeability when cured under the downhole conditions in the permeability cell. [One nano-darcy is one billionth of a darcy.] The permeability is slightly increased to 14 to 18 nano-darcy by releasing the flow pressure, but it was restored to 4 nano-darcy by increasing the flow pressure to 3,000 psi. The permeability was increased to 96 nano-darcy when the confining pressure was bled to zero, but reduced to 9 to 11 nano darcy by increasing the confining and flow pressures back to the original level. The brine permeability was almost restored to the original level. The 9 to 11 nano-darcy permeability is practically a zero permeability.

EXAMPLE 5

In an offshore well a blast furnace slag cementitious plug was set at 14,000 to 13,700 feet below a bridge plug inside an 11¾-inch casing. The plug was left in place for 14 days while the well was abandoned because of an impending hurricane. The plug was then drilled out with two 10⅝-inch bits and one cement mill with an average drilling rate of 8.8 feet per hour, 10,000 to 45,000 lbs weight-on-bit and rotational speed of 80 to 100 rpm. After the plug was drilled out, 2000 units of gas were encountered below the plug thus demonstrating the plug's low permeability, porosity and shrinkage which stopped gas migration. The plug effectively sealed and isolated the abandoned hole during this period. Thereafter, a 15.7 lbs/gal blast furnace slag/drilling fluid cementitious slurry with 3 lbs/gal chrome-free lignosulfonate thinner/retarder containing sugar, 8 lbs/bbl sodium hydroxide, 10 lbs/bbl sodium carbonate, and 300 lbs/bbl blast furnace slag were mixed in 51 bbls of PHPA drilling mud and set in the open hole from 14,605 feet to 15,130 feet. After the plug set for 26 hours, it was tagged at 14,605 feet.

The plug was very hard and allowed a successful kickoff to a new hole. The new hole did not encounter any gas from the original hole, indicating the plug effectively sealed and isolated the original hole.

While this invention has been described in detail for the purpose of illustration, it is not to be construed as limited thereby but is intended to cover all the changes and modifications within the spirit and scope thereof.

What is claimed is:

1. A primary cementing process comprising:
   introducing a cementitious slurry comprising granular water-quenched blast furnace slag into an annulus surrounding a pipe in a borehole, wherein said borehole penetrates a zone having high formation pressure, and wherein said annulus is rendered substantially free from gas migration.

2. A process according to claim 1 wherein said cementitious slurry comprises, in addition, an activator.

3. A process according to claim 2 wherein said activator is selected from the group consisting of lithium hydroxide, lithium carbonate, sodium silicate, sodium fluoride, sodium silicofluoride, magnesium hydroxide, magnesium oxide, magnesium silicofluoride, zinc carbonate, zinc silicofluoride, zinc oxide, sodium carbonate, titanium carbonate, potassium carbonate, sodium hydroxide, potassium hydroxide, potassium sulfate, potassium nitrite, potassium nitrate, calcium hydroxide, sodium sulfate, copper sulfate, calcium oxide, calcium sulfate or gypsum, calcium nitrate, calcium nitrite, and mixtures thereof and wherein said slurry comprises in addition a linear alcohol sulfonate surfactant in an amount within the range of 0.2 to 3 weight per cent based on the weight of water in said slurry.

4. A process according to claim 3 wherein said activator comprises 1 to 20 lbs/bbl of caustic soda and 2 to 50 lbs/bbl of soda ash.

5. A method according to claim 1 wherein said cementitious slurry comprises a lead component having a retarder and a tail component.

6. A method according to claim 5 wherein said retarder is a sugar-containing lignosulfonate.

7. A method according to claim 6 wherein said retarder is present in said lead in an amount sufficient to give a zero gel time of at least 24 hours at the temperature encountered in said annulus.

8. A method according to claim 1 wherein said formation pressure is greater than 5,000 psi.

9. A method according to claim 1 wherein said pipe is a casing having a length within the range of 10,000 to 15,000 feet and said cementing is carried out in one stage.

10. A method according to claim 9 wherein said cementing is carried out under conditions which include a temperature differential from the top of said casing to the bottom thereof of greater than 50° F.

11. A method according to claim 9 wherein said cementitious slurry is sufficiently retarded that an upper portion of a column thereof remains sufficiently fluid to provide hydrostatic pressure sufficient to overcome said formation gas pressure for a time sufficient to install a subsea assembly.

12. A method according to claim 1 where the water comprises a component of the drilling fluid.

13. A method according to claim 1 wherein said cementitious slurry comprises in addition a surfactant.

14. A primary cementing process comprising:
introducing a cementitious slurry comprising granular water-quenched blast furnace slag into an annulus surrounding a pipe in borehole, wherein said borehole penetrates a zone having a formation gas pressure of greater than 5,000 psi, wherein said annulus is rendered substantially free from gas migration.

15. A wellbore cementing process comprising:
determining the presence of sufficiently high formation gas pressure to cause gas migration with Portland cement; and
introducing a cementitious slurry comprising water and granular water-quenched blast furnace slag into said borehole to effect cementing, wherein said cementitious slurry is substantially free from gas migration.

16. A secondary cementing process comprising:
introducing a mass of cementitious slurry comprising granular water-quenched blast furnace slag and water into a wellbore which penetrates a zone of high formation gas pressure, displacing said mass of cementitious slurry to a location in said wellbore and maintaining said mass in said location until said mass sets, wherein said mass is substantially free from gas migration.

17. A process according to claim 16 wherein said process is a well plugging process.

18. A process according to claim 16 wherein said cementitious slurry contains a sugar containing lignosulfonate.

19. A method according to claim 16 wherein said formation gas pressure is greater than 5,000 psi.

20. A process according to claim 16 wherein said water comprises a component of used drilling fluid and wherein said slurry further comprises a surfactant.

21. A method according to claim 16 wherein said process is a process for setting a sidetracking plug.

* * * * *